April 24, 1951 P. L. KARR 2,550,272
FILM PROJECTOR

Filed May 29, 1948 4 Sheets-Sheet 1

Inventor:
Philip L. Karr,
By Chritton, Schroeder,
Merriam & Hofgren, Attys.

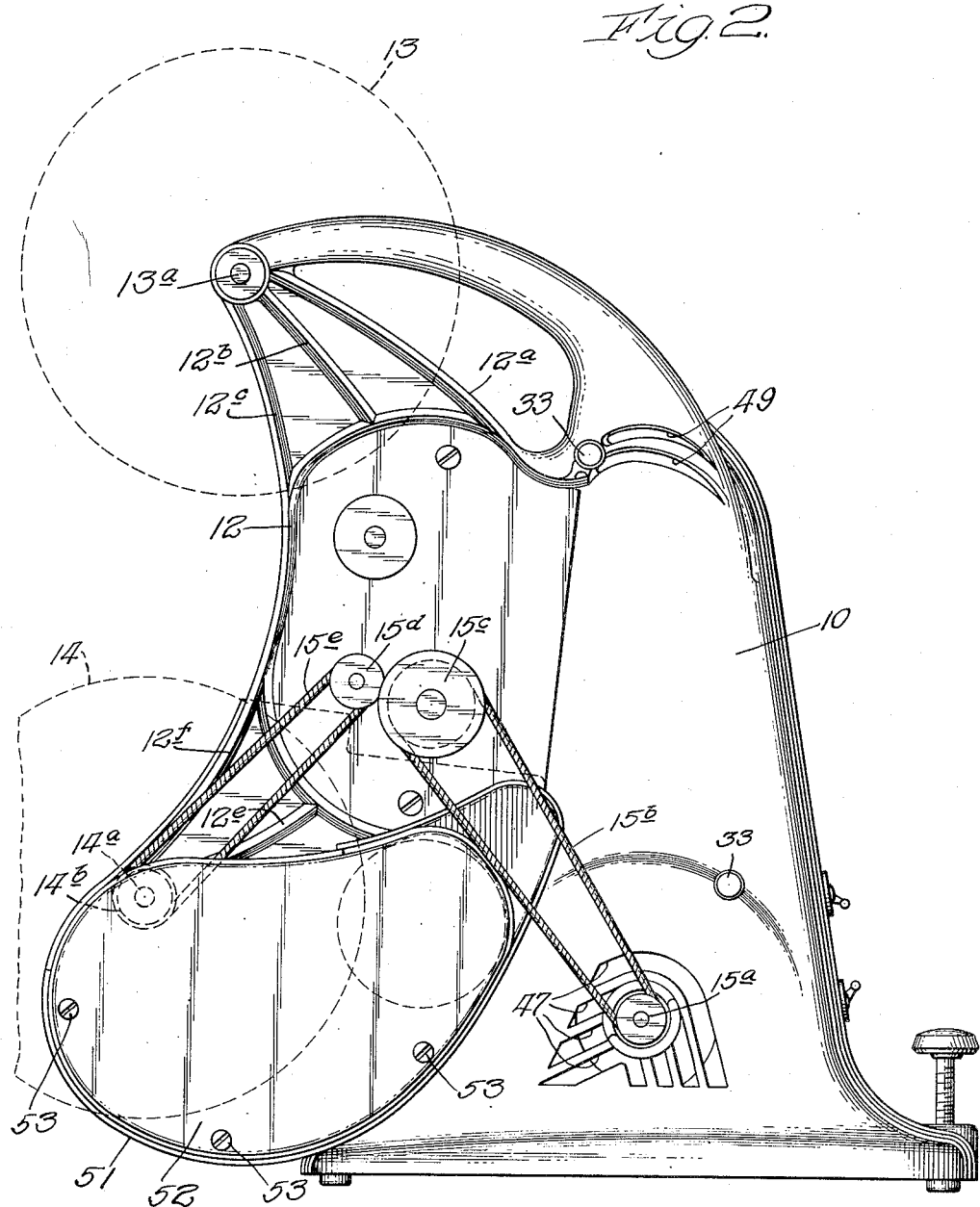

April 24, 1951
P. L. KARR
2,550,272
FILM PROJECTOR
Filed May 29, 1948
4 Sheets-Sheet 3
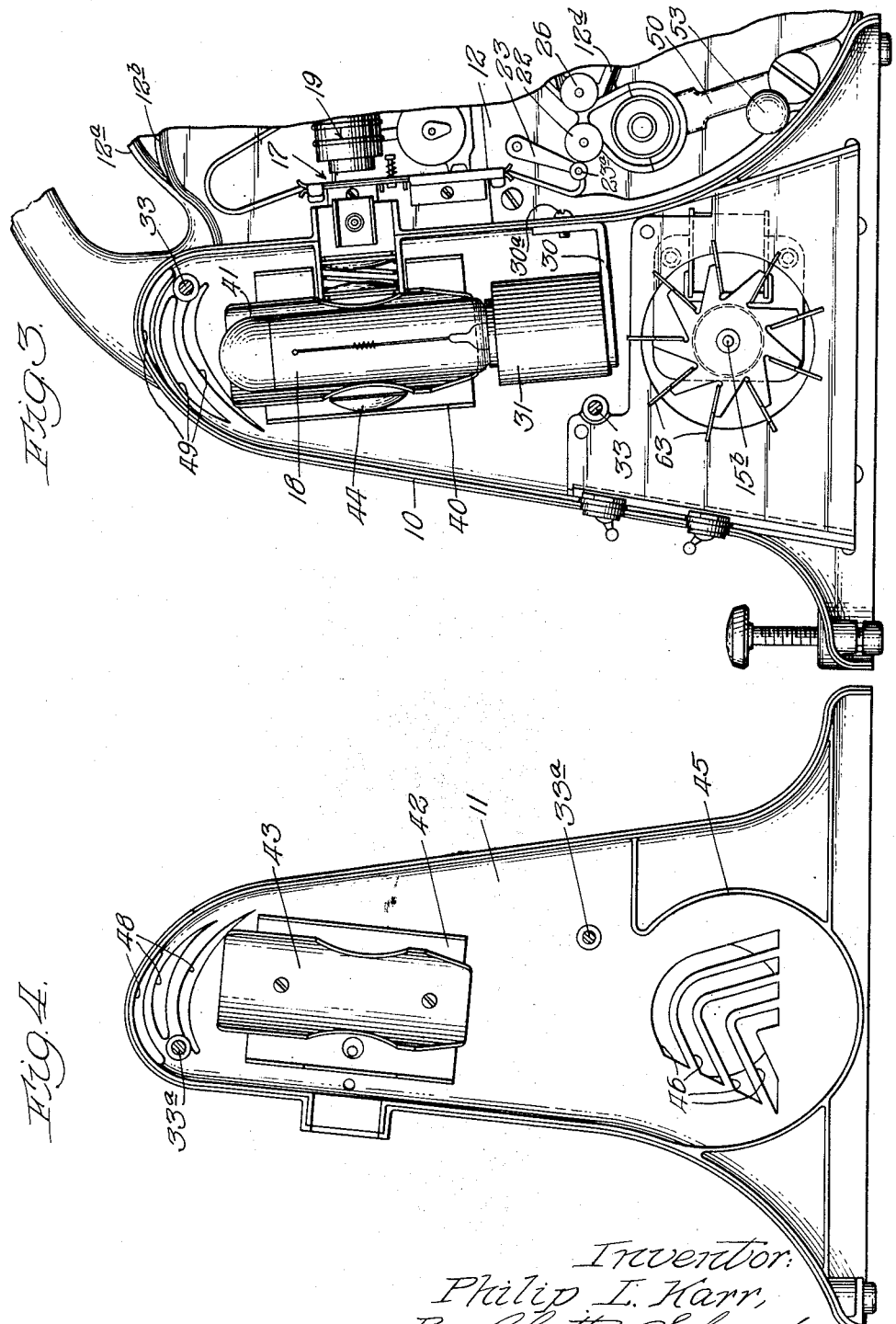
Inventor:
Philip L. Karr,
By Chritton, Schroeder,
Merriam & Hofgren, Attys.

April 24, 1951 P. L. KARR 2,550,272
FILM PROJECTOR
Filed May 29, 1948 4 Sheets-Sheet 4
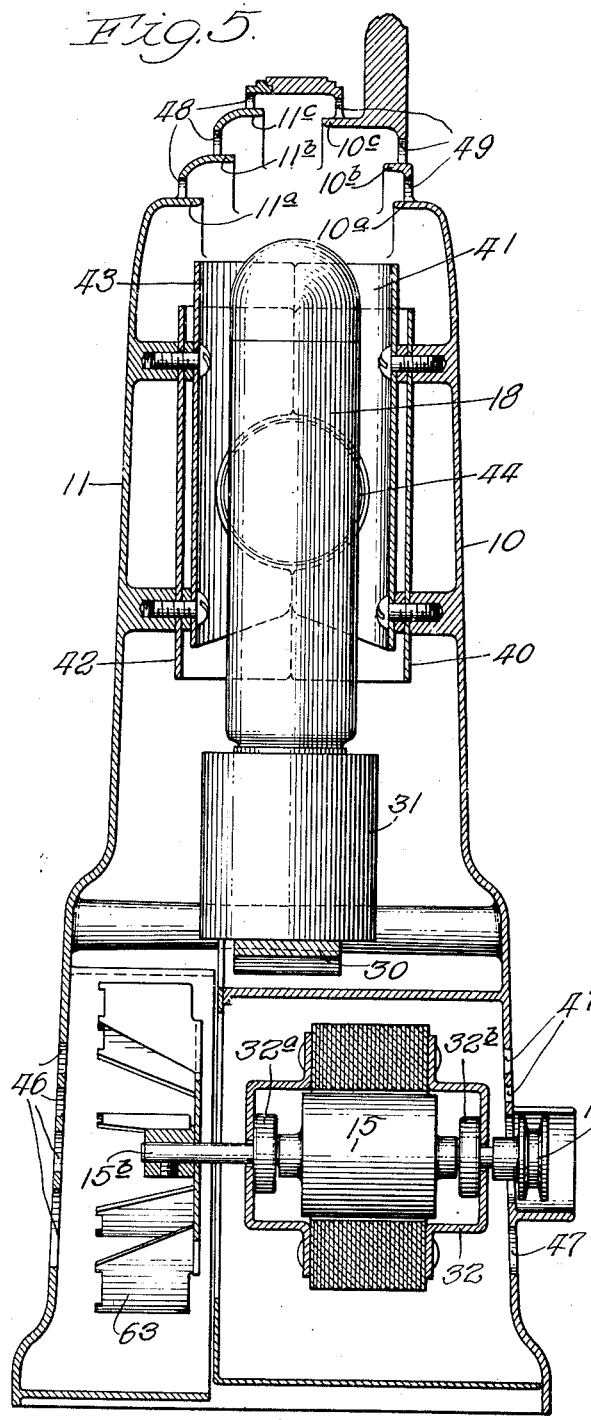
Inventor:
Philip L. Karr,
By Clinton, Schroeder,
Merriam, Hofgren & Ottis Patented Apr. 24, 1951

2,550,272

UNITED STATES PATENT OFFICE 2,550,272

FILM PROJECTOR

Philip L. Karr, Chicago, Ill., assignor to Illinois Watch Case Co., a corporation of Illinois Application May 29, 1948, Serial No. 30,020

16 Claims. (Cl. 88—24)

This invention relates to a film projector, and more particularly to an improved housing arrangement here shown as embodied in a sound film projector.

One feature of this invention is that it provides a film projector body comprising two readily separable body members forming a housing, one of said members having a portion projecting forwardly of said housing, this arrangement providing a very satisfactory yet simple construction, particularly for a sound projector; another feature of this invention is that it provides an improved blower fan housing and scroll integral with one of the body members forming the projector housing; and another feature of this invention is that it provides an improved air circulation and light trap arrangement.

Further features and advantages of this invention will be apparent in the following specification and from the drawings in which:

Fig. 2 is a side elevational view of the projector of Fig. 1 looking from the opposite side thereof;

Fig. 3 is a fragmentary side elevational view similar to Fig. 1, but with the body member which forms the cover removed;

Fig. 4 is an interior view of the body member which forms the cover;

Fig. 5 is an enlarged vertical section taken along the line 5—5 of Fig. 1; and

Fig. 6 is a front elevation of the projector of Fig. 1.

Figure 1:
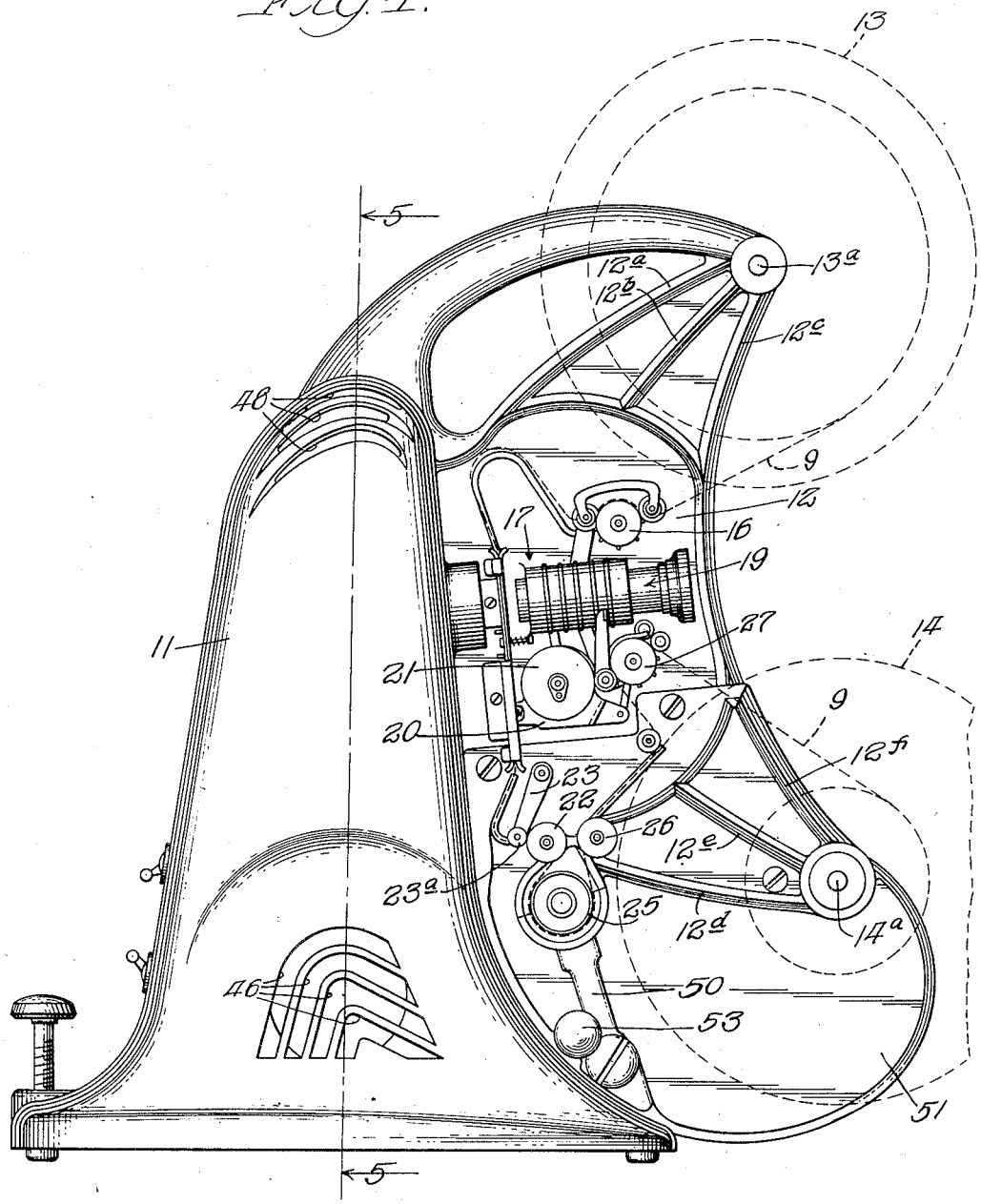
Fig. 1 is a side elevational view of a sound film projector constructed in accordance with the invention.

In the sound projector illustrated in the drawings, the projector body comprises a first body member 10 and a second body member 11, said members being removably joined together to form a housing, the member 10 having a portion 12 projecting forwardly thereof, and the drive and illuminating apparatus for the film all being mounted on a portion of the body.

The projecting portion 12 carries a film feed spool 13 on a stub shaft 13a carried on arms 12a, 12b and 12c projecting from the top thereof, and said portion carries a film takeup spool 14 on a stub shaft 14a carried on arms 12d, 12e and 12f projecting from the bottom thereof, the takeup spool being driven by an electric motor 15 in the housing (see Fig. 5), this drive being accomplished in conventional manner by means of a drive arrangement including a pulley 15a on the drive shaft 15b of the motor, a pulley 15c on the claw geared to a pulley 15d which is connected by a belt 15e to a pulley 14b on the stub shaft 14a. A film 9 which is initially wound on the feed spool 13 is transferred to the takeup spool 14 during the operation of the projector, this film passing over a sprocket 16 from where it is fed past a film gate 17 which may be conventional. A projection lamp 18 within the housing illuminates that portion of the film which is opposite the aperture in the gate 17, and a lens arrangement 19 is adapted to focus the beam of light on the screen.

As is well understood in the art, means are provided for causing the film to move intermittently past the gate so that each frame of the film is stationary during the time that light from the projection lamp is thrown upon it, this means comprising a claw 20 driven in conventional manner by a cam arrangement 21. After leaving the gate 17 the film passes over a roller 22, being held in frictional contact with said roller by a lever arm 23 which carries a supplemental roller 23a. A sound drum 25 carries the now continuously moving film past the sound take-off apparatus, and the film then moves over another roller 26, over a take-up sprocket 27, and onto the takeup spool 14. The general operation of the apparatus just described is conventional and will not be further described here.

The present invention provides an improved body including a housing arrangement for such a projector. A bracket 30 is mounted on the inside of the body member 10 by means of a bolt 30a, and a socket 31 for the projection lamp 18 is carried on said bracket. On the lower portion of the member 10 is another bracket 32, this bracket providing a housing for the drive motor 15, the shaft 15b of said motor being journalled in bearings 32a and 32b on said bracket, one end of the drive shaft 15b extending through an opening in the body member 10 to provide a mount for the pulley 15a and the other end of the drive shaft extending into the housing to provide a mount for a blower fan 63.

The second body member 11, which is of similar configuration to the first body member 10 is adapted to be readily removably joined to the member 10 to complete the housing for the illuminating and drive apparatus, one or more bolts 33 cooperating with threaded openings 33a in the member 11 to provide apparatus for removably joining the members together.

On the member 10 a bracket 40 carries a reflecting and light shielding member 41, and a similar bracket 42 on the body member 11 carries a similar reflecting and shielding member 43, the members 41 and 43 abutting at their rear edge as shown in Fig. 5 and having an opening therein for a reflector 44 which is carried by the member 10.

As best seen in Fig. 4 the member 11 has at its bottom portion a scroll 45 preferably being formed integrally therewith and providing a housing and air channel for the blower fan 63.

The advantages of the two piece construction just described are many since each body member 10 and 11 may be formed by economical and relatively simple processes, as by stamping or casting which are cheap single step operations as opposed to other methods heretofore known in forming a projector housing. Furthermore, when the members 10 and 11 are joined together by the bolts 33 they form a housing for the drive and illuminating apparatus, the reflector arrangement for the projection lamp and the scroll for the blower fan automatically assuming their operable positions when the cover 11 is placed on the body member 10.

In the bottom of the housing are openings 46 in the member 11 opposite the center of the scroll 45, and in the bottom of the member 10 are openings 47 so that when the motor 15 operates the blower fan 63 air is drawn in on both sides of the housing, these bottom openings being in a vertical plane. Because the openings 46 are relatively unobstructed, the majority of air is drawn in through these openings, but a substantial amount of air also enters the housing through the openings 47, this latter air flowing over the motor 15 and serving to keep the motor cool during operation, the motor being in the bottom of the housing between the fan and the openings in the member 10 and in the path of air entering said housing through said openings. If desired I may mount other elements of the projector in the path of the air coming through the openings 46 and 47, as for example a resistor comprising a portion of the electric circuit associated with the projector. After entering the fan housing the air drawn in through the openings 46 and 47 follows the path defined by the scroll 45 and flows over the projection lamp 18 in order to cool such lamp. By arranging the air inlet openings of approximately equal size on each side of the housing as shown, but by placing the motor 15 in the path of only one of said openings I assure that the majority of air which is utilized for cooling the projection lamp is itself cool.

At the top of the housing each member 10 and 11 is formed with a plurality of exhaust openings designated at 48 in the member 11 and at 49 in the member 10. These openings are formed in vertical planes as illustrated in Fig. 5, and horizontally extending baffle projections 10a—c and 11a—c respectively extend into the housing below each opening in an amount sufficient to prevent beams of light from the projection lamp 18 from projecting through the exhaust openings. With this construction the flow of exhaust air out of the openings 48 and 49 is substantially unimpeded since the air does not necessarily follow a straight line of travel. However, the projections 10a—c and 11a—c completely block off all beams of light from the projection lamp 18. This light trap provides an improvement in projector construction, since the strong beams of light from the projection lamp (which normally is a 500 watt lamp) are a source of annoyance to the operator of a projector built without a light trap in the air exhaust outlet, and such beams of light also are troublesome to other observers stationed at the sides of or behind a conventional projector without a light trap.

In the projector illustrated a casing 50 (Fig. 1) contains a source of radiant enregy which is focused on the sound track of the film 9, preferred apparatus for providing and focusing these waves being particularly described in the application of Philip L. Karr for "Actuating Apparatus for Sound Systems" filed March 5, 1948, as Serial No. 13,245 and in the application of Henry J. Koeber for "Focusing Mount for a Lens" filed June 21, 1948, as Serial No. 34,193, now Patent No. 2,498,555, dated February 21, 1950. A photoelectric cell or other pickup device is carried within the sound drum 25 adjacent the sound track of the film and picks up waves from the source which have been modulated in accordance with the sound indications on the sound track. These modulated waves are converted into electrical energy which are then amplified and translated into sound in any conventional manner.

In the projector illustrated the waves from the radiant source are converted into electrical waves by the photoelectric cell and the electrical waves are utilized to modulate a carrier wave of radio frequency generated by electronic signal handling apparatus including an oscillator carried by the projector. The modulated carrier wave is transmitted to a separate amplifying and reproducing system, as for example that of a conventional radio receiver.

A removable mounting plate 51 is bolted onto the projecting portion 12 and carries the electronic apparatus for generating and modulating the carrier waves. As shown in Figs. 2 and 6 a cover plate 52 is mounted on the plate 51 by means of screws 53, thus providing a compact closed housing for the electronic apparatus integral with the projector. One or more controls, as the control 53, may be provided for adjusting the electronic apparatus.

While I have shown and described certain embodiments of my invention it is to be understood that it is capable of many modifications. Changes, therefore, in the construction and arrangement may be made without departing from the spirit and scope of the invention as disclosed in the appended claims.

I claim:

1. In a motion picture film projector having drive and illuminating apparatus for said film, a projector body of the character described, including: a first body member; a second body member; and apparatus for removably joining said members together to form a housing, one of said members having a portion projecting forwardly of said housing, and said drive and illuminating apparatus all being mounted on a portion of said body and at least one of said body members having an integral base portion for supporting said projector body upon a surface.

2. In a motion picture film projector having a drive motor, a projection lamp and a fan, a projector body of the character described, including: a first body member having an integral base portion; a second body member having a complementary integral base portion; and apparatus for removably joining said members together to form a housing for said lamp and fan, one of said members having the fan scroll integral therewith, said complementary base portions forming means for supporting said projector body upon a table surface.

3. In a motion picture film projector having a drive motor, a projection lamp and a fan, a projector body of the character described, including: a first body member; a second body member; and apparatus for removably joining said members together to form a housing for said lamp and fan, one of said members having the fan scroll integral therewith, said fan being near the bottom of the housing and both members having air openings disposed in a vertical plane near the top and bottom, whereby air moves into the housing near the bottom thereof from both sides and moves out of the top thereof at both sides.

4. In a sound film projector having drive and illuminating apparatus for said film and electronic signal handling apparatus, a projector body of the character described, including: a first body member; a second body member; and apparatus for removably joining said members together to form a housing, one of said members having a plate projecting forwardly of said housing and all of said apparatus being mounted on a portion of said body, said electronic signal handling apparatus being carried by said projecting plate.

5. In a sound film projector having a drive motor, a projection lamp, a fan, and electronic signal handling apparatus, a projector body of the character described, including: a first body member; a second body member; and apparatus for removably joining said members together to form a housing for said lamp and fan, one of said members having the fan scroll integral therewith, one of said members having a plate projecting forwardly of said housing and carrying said electronic signal handling apparatus.

6. In a sound film projector having a drive motor, a projection lamp, a fan, and electronic signal handling apparatus, a projector body of the character described, including: a first body member; a second body member; and apparatus for removably joining said members together to form a housing for said lamp and fan, one of said members having the fan scroll integral therewith, one of said members having a portion projecting forwardly of said housing and carrying said signal handling apparatus, said fan being near the bottom of the housing and both members having air openings disposed in a vertical plane near the top and bottom, whereby air moves into the housing near the bottom thereof from both sides and moves out of the top thereof at both sides.

7. In a sound film projector having drive and illuminating apparatus for said film and electronic signal handling apparatus, a projector body of the character described, including: a first body member; a second body member; apparatus for removably joining said members together to form a housing, said first member having a portion projecting forwardly of said housing and all of said apparatus being mounted on said first member and said projecting portion, said signal handling apparatus being carried by said projecting portion; and a lens tube projecting forwardly of said housing above said projecting portion.

8. In a sound film projector having a drive motor, a projection lamp, a fan, and electronic signal handling apparatus, a projector body of the character described, including: a first body member; a second body member; and apparatus for readily removably joining said members together to form a housing, said first member having a portion projecting forwardly of said housing, said motor, lamp and fan being mounted on said first member within said housing, said fan being near the bottom of the housing, and said signal handling apparatus being carried by said projecting portion.

9. Apparatus of the character claimed in claim 8, wherein said second body member has a fan scroll integral therewith and said member provides a cover for the housing.

10. In a sound film projector having drive and illuminating apparatus for said film and electronic signal handling apparatus, a projector body of the character described, including: a first body member; a second body member; and apparatus for removably joining said members together to form a housing, one of said members having a portion projecting forwardly of said housing and all of said apparatus being mounted on a portion of said body, all of said signal handling apparatus being mounted on a removable member depending from said projecting portion.

11. In a sound film projector having a drive motor, a projection lamp, a fan, and electronic signal handling apparatus, a projector body of the character described, including: a first body member; a second body member; and apparatus for readily removably joining said members together to form a housing, said first member having a portion projecting forwardly of said housing, said motor, lamp and fan being mounted on said first member within said housing, said fan being near the bottom of the housing, and said signal handling apparatus being carried by said projecting portion.

12. In a sound film projector having a drive motor, a projection lamp, a fan, and electronic signal handling apparatus, a projector body of the character described, including: a first body member; a second body member; apparatus for readily removably joining said members together to form a housing, said first member having a portion projecting forwardly of said housing, said motor, lamp and fan being mounted on said first member within said housing; a removable plate depending from said projecting portion and carrying said electronic apparatus; and a cover for said plate to form a housing for said electronic apparatus.

13. In a sound film projector having a drive motor, a projection lamp, a fan and electronic signal handling apparatus, a projector body of the character described, including: a first body member; a second body member; and apparatus for removably joining said members together to form a housing for said motor, lamp and fan, said first member carrying said motor, lamp and fan and said second member having a fan scroll integral therewith.

14. Apparatus of the character claimed in claim 13, wherein said first member has a portion projecting forwardly of said housing and said electronic apparatus is carried on a removable plate depending from said projecting portion.

15. Apparatus of the character claimed in claim 6, wherein said motor is mounted between said fan and the bottom opening on one side of said housing in the path of air moving into said housing through said opening.

16. Apparatus of the character claimed in claim 6 wherein there are a plurality of stepped spaced horizontal baffles on each side of the housing near the top providing said openings and also providing a light trap.

PHILIP L. KARR.

REFERENCES CITED

The following references are of record in the file of this patent:

UNITED STATES PATENTS

| Number | Name | Date |
|---|---|---|
| 1,375,089 | Granz | Apr. 19, 1921 |
| 1,891,683 | Morsbach | Dec. 20, 1932 |
| 1,919,595 | Owens | July 25, 1933 |
| 2,057,153 | Lessler | Oct. 13, 1936 |
| 2,362,601 | Wengel | Nov. 14, 1944 |
| 2,366,554 | Peck et al. | Jan. 2, 1945 |